US012769930B2

(12) United States Patent
Muñoz Soler et al.

(10) Patent No.: US 12,769,930 B2
(45) Date of Patent: Oct. 20, 2026

(54) METHOD AND SYSTEM TO IMPROVE LOSS REPORTING

(71) Applicant: CCC Intelligent Solutions Inc., Chicago, IL (US)

(72) Inventors: Francisco Muñoz Soler, Chicago, IL (US); Varun Sridharan, Chicago, IL (US); Surendran Narayanamoorthy, Aurora, IL (US)

(73) Assignee: CCC Intelligent Solutions Inc., Chicago, IL (US)

( * ) Notice: Subject to any disclaimer, the term of this patent is extended or adjusted under 35 U.S.C. 154(b) by 0 days.

(21) Appl. No.: 18/231,475

(22) Filed: Aug. 8, 2023

(65) Prior Publication Data

US 2024/0370641 A1 Nov. 7, 2024

Related U.S. Application Data

(60) Provisional application No. 63/464,068, filed on May 4, 2023.

(51) Int. Cl.
*G06F 40/174* (2020.01)

(52) U.S. Cl.
CPC .................................. *G06F 40/174* (2020.01)

(58) Field of Classification Search
CPC ..................................................... G06F 40/174
See application file for complete search history.

(56) References Cited

U.S. PATENT DOCUMENTS

| | | | | |
|---|---|---|---|---|
| 11,676,215 | B1 * | 6/2023 | Feiteira | G06Q 40/08 705/4 |
| 11,915,319 | B1 * | 2/2024 | King | G06N 5/04 |
| 2002/0035488 | A1 * | 3/2002 | Aquila | G06Q 40/02 705/4 |
| 2008/0065974 | A1 * | 3/2008 | Campbell | G06Q 10/107 715/200 |
| 2009/0240531 | A1 * | 9/2009 | Hilborn | G06Q 10/10 705/4 |
| 2013/0339030 | A1 * | 12/2013 | Ehsani | G10L 17/00 704/275 |
| 2020/0177730 | A1 * | 6/2020 | Dutta | H04M 3/5191 |
| 2021/0349880 | A1 * | 11/2021 | Kung | G06F 16/215 |
| 2024/0184808 | A1 * | 6/2024 | Prystupa | G06F 16/958 |

OTHER PUBLICATIONS

Fernando et al. "Automated vehicle insurance claims processing using computer vision and NLP", Nov. 30, 2022, IEEE, pp. 124-129 (Year: 2022).*

* cited by examiner

*Primary Examiner* — Tuyetlien T Tran
(74) *Attorney, Agent, or Firm* — Loeb & Loeb LLP

(57) ABSTRACT

A method of receiving information from a first notice of a loss may be disclosed. A person may provide a description of a loss event. The description may be stored in a memory. The communication may be converted to text using a voice transcription system. The text may then be analyzed to determine if the text relates to know fields. If the determination is positive, the text is placed in the detected field. Once the fields are full, an index is calculated.

11 Claims, 4 Drawing Sheets

METHOD AND SYSTEM TO IMPROVE LOSS REPORTING

CROSS-REFERENCE TO RELATED APPLICATIONS

This application claims priority to U.S. Provisional Application No. 63/464,068, filed May 4, 2023, the disclosure of which is incorporated by reference herein in its entirety.

BACKGROUND

Filling out forms may be tedious and tiresome. This is especially true when trying to fill out a form on a mobile device and it may be even more true after a stressful event, such as an accident. Excitement may make it difficult to accurately fill in forms and users may simply quit. As a result, more time is wasted by the reporting person and the receiving person as the required information will have to be obtained in slower and more time consuming ways.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

A method of receiving information from a first notice of a loss may be disclosed. A person may provide a description of a loss event. The description may be stored in a memory. The communication may be converted to text using a voice transcription system. The text may then be analyzed to determine if the text relates to know fields. If the determination is positive, the text is placed in the detected field. Once the fields are full, an index is calculated.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

SPECIFICATION

The present disclosure now will be described more fully hereinafter with reference to the accompanying drawings, which form a part hereof, and which show, by way of illustration, specific exemplary embodiments by which the disclosure may be practiced. These illustrations and exemplary embodiments are presented with the understanding that the present disclosure is an exemplification and is not intended to be limited to any one of the embodiments illustrated. The disclosure may be embodied in many different forms and should not be construed as limited to the embodiments set forth herein; rather, these embodiments are provided so that this disclosure will be thorough and complete, and will fully convey the scope of the disclosure to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Figure 1:
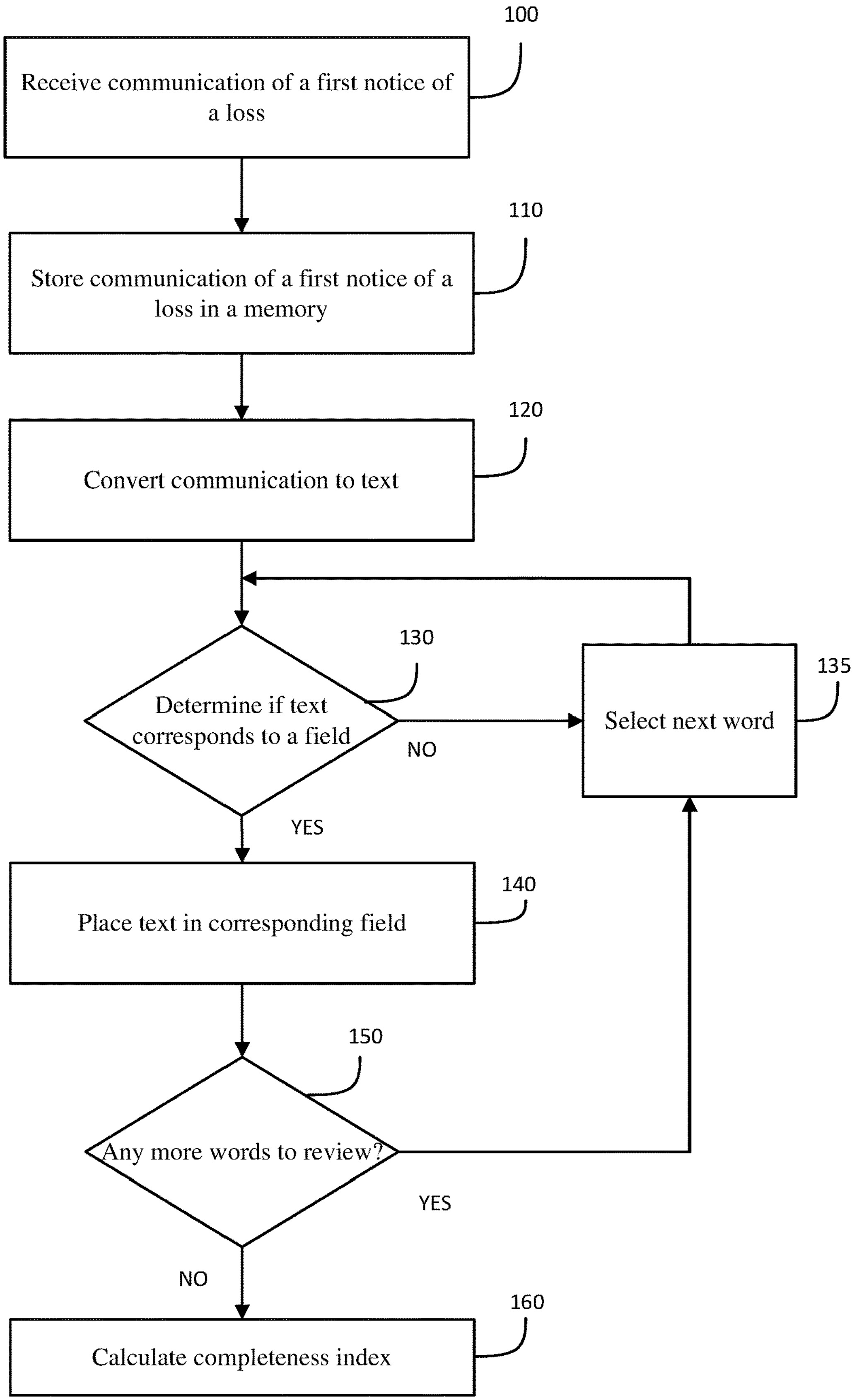
FIG. 1 may illustrate blocks performed by a processor according to a method in accordance with the claims.

Referring to FIG. 1, a method of receiving information from a user about a first notice of a loss is described. Filling out forms may be tedious and tiresome. This is especially true when trying to fill out a form on a mobile device and it may be even more true after a stressful event, such as an accident. Excitement may make it difficult to accurately fill in forms and users may simply quit. As a result, more time is wasted by the reporting person and the receiving person as the required information will have to be obtained in slower and more time consuming ways. In response, a person may provide a description of a loss event. The description may be stored in a memory. The communication may be converted to text using a voice transcription system. The text may then be analyzed to determine if the text relates to know fields. If the determination is positive, the text is placed in the detected field. Once the fields are full, an index is calculated.

At block 100, the system may receive a communication to report a loss. The communication may be an oral statement that describes the loss in the view of the user. The description may contain some useful information and some information that is not useful.

Figure 2:
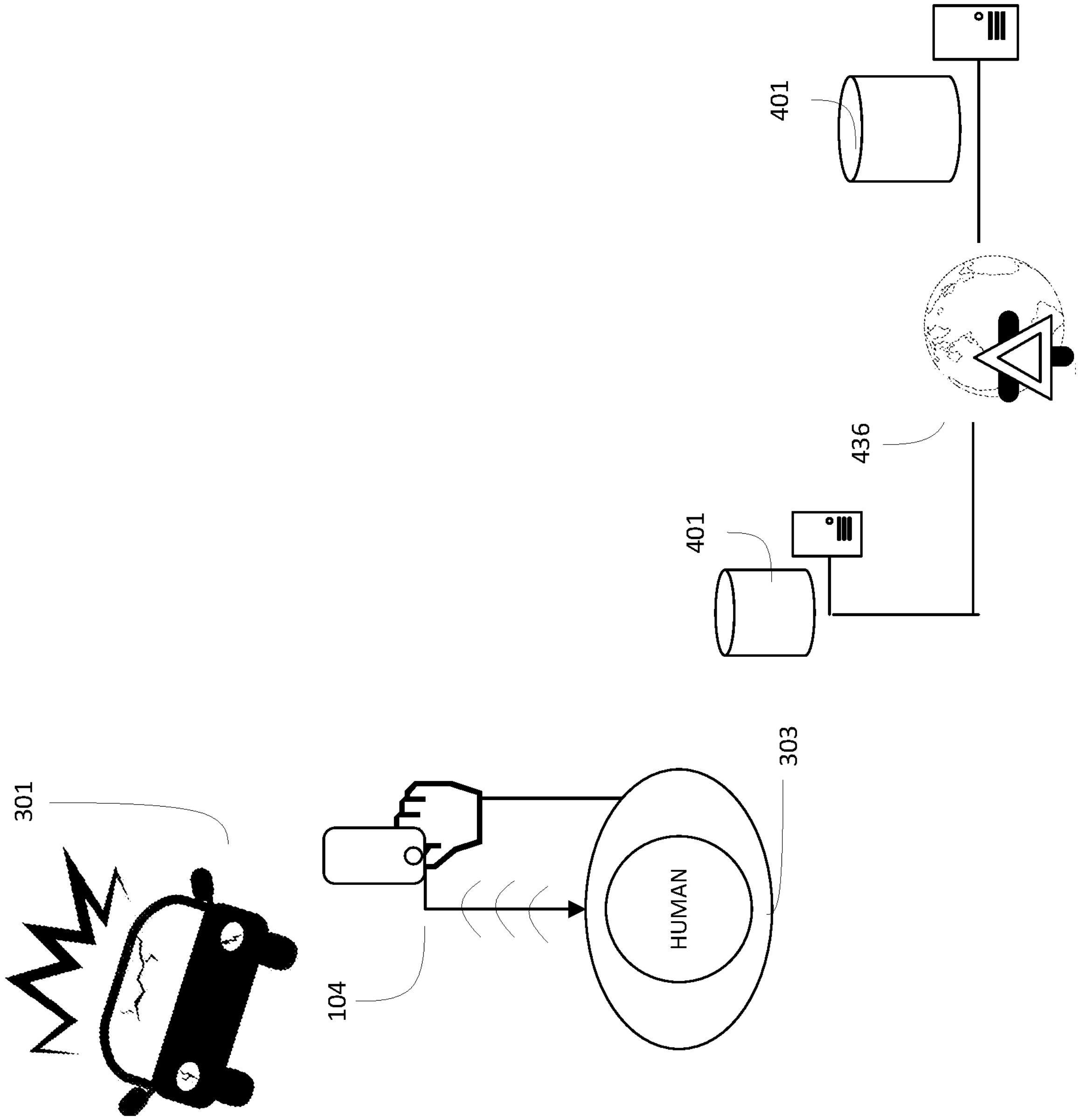
FIG. 2 may illustrate a sample verbal description of communicating a first notice of loss.

Referring briefly to FIG. 2, a user 303 may have been in an accident. The user may use a smart phone 104 to communicate a verbal description of the accident and the damage to the vehicle 301. The communication may proceed as a cellular call or as a web based call to the insurance carrier or the party tasked with interpreting the call for useful data.

At block 110, the communication may be stored in a memory. The memory may be part of the computer system as is described in FIG. 4. The memory may be specifically adapted to storing voice and may also be adapted to assist in the transcription process described in block 120.

At block 120, the communication may be converted to text using a voice transcription system. Software from Trint, Otter, Zapier or Google or others may be used to translate the voice to text. In some embodiments, natural language processing algorithms may be used to create or assist in creating the translation. The natural language algorithms may leverage advanced deep learning techniques, such as the transformer architecture which may work on entire sentences or paragraphs rather than a word at a time, to enable accurate recognition and transcription of a variety of languages and dialects, as well as the ability to handle domain-specific terminologies. The software may operate on hardware specifically configured to quickly and accurately convert the text. Thus in some embodiments, it may have additional memory or a high speed processor to quickly move through the text.

At block 130, the system may determine whether the text relates to known fields using a field detection model. If the determination is no, the method may select the next word or phrase at block 135 and the next word or phrase may be analyzed. If the determination at block 130 is yes, the field identification module may analyze the transcribed text to identify first notice of loss (FNOL) fields mentioned in the audio input. This module may utilize supervised and unsupervised machine learning algorithms, combined with predefined FNOL dictionaries to match the spoken input to the corresponding field. The module also accounts for variations in field names, synonyms, and abbreviations to enhance its identification accuracy.

As an example, a manufacturer of car may be mentioned in the stored message. The manufactures of cars may be known and may be a finite list. The text may be compared to the known makes of cars to see if there is a match. In addition, the manufacturers of cars may include abbreviates such as Chevy for Chevrolet or Rolls for Rolls Royce.

The module may learn from past messages to improve the text recognition in the future. For example, some users may simply say "Corvette" assuming the receiver will know a Corvette is a Chevrolet. The system may learn from past entries of "Corvette" to know the manufacture is Chevrolet. As more data is received and corrected, the model will continue to improve.

At block 140, the text may be placed in detected field using a value detection module. The value detection module may extract and associate the values provided in the audio input with their corresponding FNOL fields. This module employs again a combination of machine learning techniques and rule-based algorithms. Further, the module will improve over time as more data is received, verified and added to the module.

At block 150, the method may determine if all the word or phrases in the text of the communication of the first notice of loss have been assigned to corresponding fields. If all the word or phrases have been analyzed, the method may continue to block 160. If there are more word or phrases to analyze, the method may return to block 135 where the next word or phrase may be selected to be analyzed.

At block 160, once the fields are full, a completeness index may be calculated using a completeness index calculation module. The first notice of loss completeness index calculation module may computes a numerical index to evaluate the quality of the collected information. It considers multiple factors, including total number of FNOL fields filled, accuracy of the detected values, importance of each field in the context of the straight through processing (STP) prediction, and the presence of any required or conditional fields. STP involves pre-populating as much of the estimate as possible and auto writing the lines with a high degree of confidence. That includes all operations, parts selections and pricing generated by AI using vehicle and claims data—with a focus on low-severity incidents. Once this data is captured and photos or videos of the damage analyzed, machine-learning algorithms translate the results into component-level estimate lines for appraiser review and approval.

The index calculation module may employ a weighted scoring system that assigns greater importance to critical fields, ensuring a comprehensive evaluation of the data. For example, a make and model of a car may be given a high weight as the make and model have a strong relationship to the cost of a repair.

A FNOL Completeness Index Calculation Module may determine the index and the index may evaluate the quality of the collected information. The module may analyzes at least one of:

- a total number of FNOL fields filled,
- an accuracy of the detected values,
- importance of each field in the context of the STP prediction, and
- a presence of any required or conditional fields.

The module may also employ a weighted scoring system that assigns greater importance to critical fields.

At block 160, based on the index, it may be determined if interactive questions are needed or if the scores are acceptable. Based on the index, the system may determine if interactive questions are needed to fill in the fields and obtain an acceptable index score. For example, a low score may indicate that some key field have been left empty. The system may then ask for values for those key fields. The index may be re-calculated after the entry of the answers to the interactive questions. For example, if the user is not known, the system may be able to work backward using the VIN to determine the user but if virtually all the information is missing, the system will not be able to fill in the missing fields and the score will be below a threshold. If the score is below a threshold, follow up questions may be required. If the score is over the threshold, the system may proceed with the ensuing analysis which may be straight through by software or may be analyzed by a human or a combination of the two.

In some embodiments, the sound file may be communicated to a user computing device or display 200 where it may be stored and viewed. The electronic sound file may be communicated using a known protocol for accuracy, efficiency and security reasons. In some additional embodiments, the sound file may be communicated to a web portal and a known protocol may be used. The electronic sound file may accessed using an API. In some embodiments, the sound file may be stored using encryption to ensure it is not copied.

Figure 3:
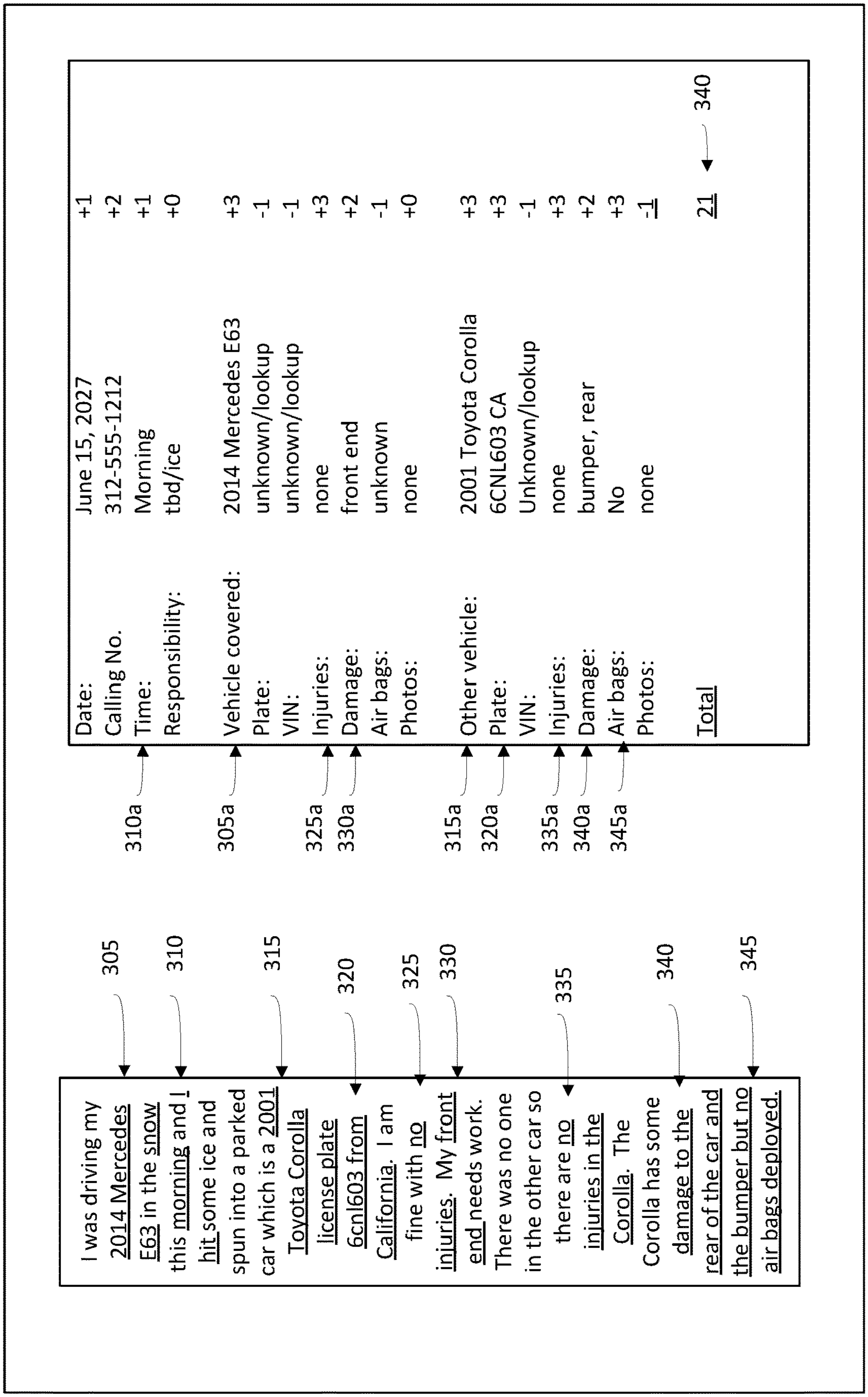
FIG. 3 may illustrate a graphical display of the system filling in blocks of data.

Referring again to FIG. 3, a user may report an accident. It may be the first notice of the loss. The user may state:

I was driving my 2014 Mercedes E63 in the snow this morning and I hit some ice and spun into a parked car which is a 2001 Toyota Corolla license plate 6cn1603 from California. I am fine with no injuries. My front end needs work. There was no one in the other car so there are no injuries in the Corolla. The Corolla has some damage to the rear of the car and the bumper but no air bags deployed.

Figure 4:
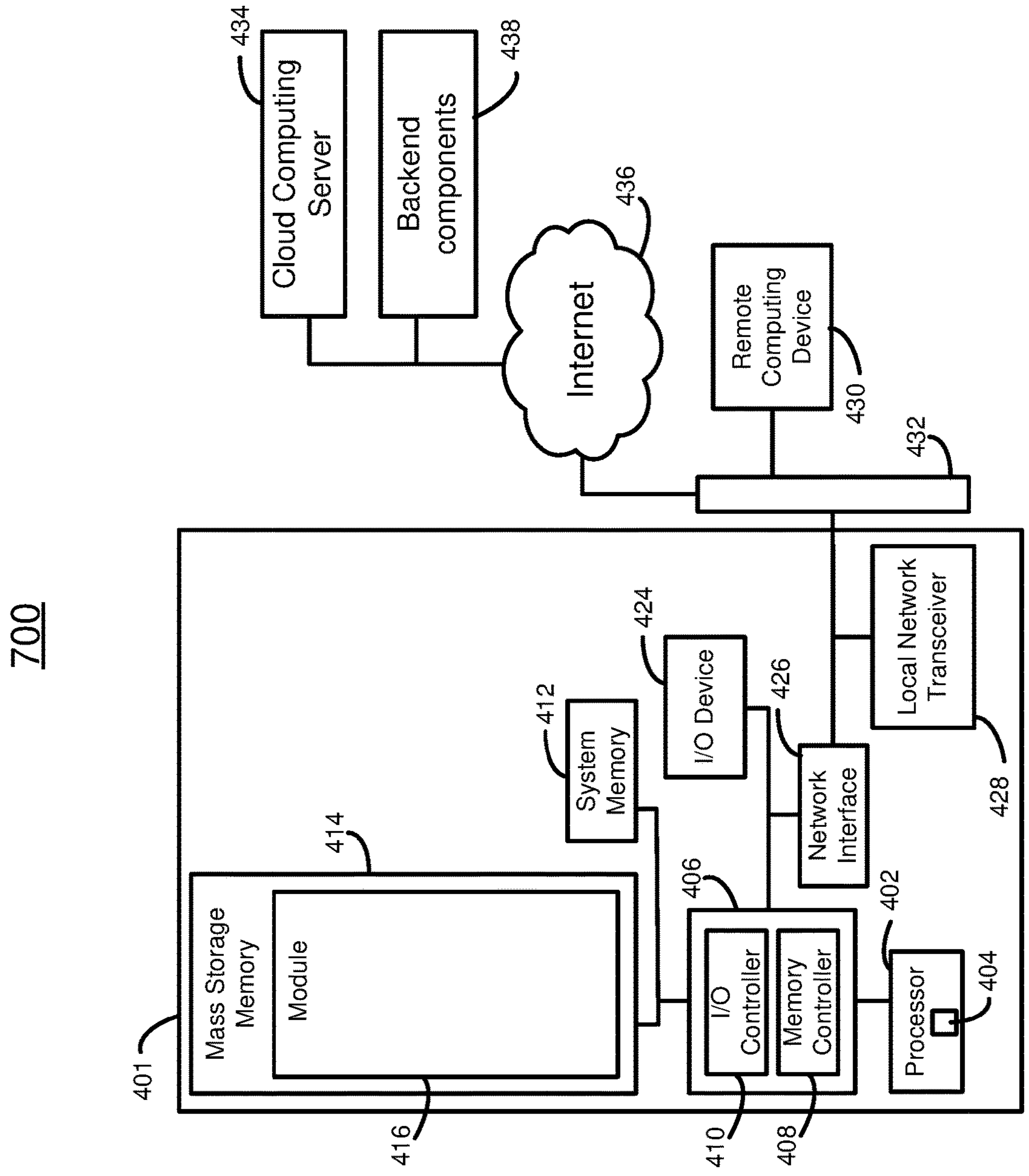
FIG. 4 may illustrate a sample computing system.

The system may first save and convert the audio message to text. The text may then be analyzed to determine whether the text relates to a corresponding field in the loss system. For example, "2014 Mercedes E63" 305 may correspond to the vehicle covered 305*a* and the value of 2014 Mercedes E63 may be entered into the loss system. Each of the underlined values above 310-345 may be determined to correspond with fields 310*a*-345*a* in the system and the values may be entered into the system. Some values may require more than a literal cut/paste into the system. For example, the time of the accident was not given but the approximate time of the call may be determined based on the time of the call and that the incident was in the morning. Further, the system may look up some values based on the information given. For example, the system may be able to use the license plate number and state to determine a VIN number. Again, this is just an example as some important data such as the location of the accident is not shown in this exemplary example which is not meant to be limiting FIG. 4 is a high-level block diagram of an example computing environment 400 for the system 100 and methods (e.g., method in FIG. 1) as described herein. The computing device 400 may include a server, a mobile computing device, a cellular phone, a tablet computer, an electronic reader, a virtual reality headset, an artificial reality headset, a Wi-Fi-enabled device or other personal computing device capable of wireless or wired communication, a thin client, or other known type of computing device (e.g., a mobile computing device 104, a merchant computer system 106, a payment network system 108 and a payment device issuer system 111, etc.). Logically, the computing device 400 may be designed and built to specifically execute certain tasks.

As will be recognized by one skilled in the art, in light of the disclosure and teachings herein, other types of computing devices can be used that have different architectures. Processor systems similar or identical to the example systems and methods described herein may be used to implement and execute the example systems and methods described herein. Although the example system 400 is described below as including a plurality of peripherals, interfaces, chips, memories, etc., one or more of those elements may be omitted from other example processor systems used to implement and execute the example systems and methods. Also, other components may be added.

As shown in FIG. 4, the computing device 401 may include a processor 402 that is coupled to an interconnection bus. The processor 402 may include a register set or register space 404, which is depicted in FIG. 4 as being entirely on-chip, but which could alternatively be located entirely or partially off-chip and directly coupled to the processor 402 via dedicated electrical connections and/or via the interconnection bus. The processor 402 may be any suitable processor, processing unit or microprocessor. Although not shown in FIG. 4, the computing device 401 may be a multi-processor device and, thus, may include one or more additional processors that are identical or similar to the processor 402 and that are communicatively coupled to the interconnection bus.

The processor 402 of FIG. 4 may be coupled to a chipset 406, which includes a memory controller 408 and a peripheral input/output (I/O) controller 410. As is well known, a chipset may typically provide I/O and memory management functions as well as a plurality of general purpose and/or special purpose registers, timers, etc. that are accessible or used by one or more processors coupled to the chipset 406. The memory controller 408 may perform functions that enable the processor 402 (or processors if there are multiple processors) to access a system memory 412 and a mass storage memory 414, that may include either or both of an in-memory cache (e.g., a cache within the memory 412) or an on-disk cache (e.g., a cache within the mass storage memory 414).

The system memory 412 may include any desired type of volatile and/or non-volatile memory such as, for example, static random access memory (SRAM), dynamic random access memory (DRAM), flash memory, read-only memory (ROM), etc. The mass storage memory 414 may include any desired type of mass storage device. For example, the computing device 401 may be used to implement a module 416 (e.g., the various modules as herein described). The mass storage memory 414 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 401, the systems and methods described herein. Thus, a module, block, function, operation, procedure, routine, step, and method can be implemented in hardware, firmware, and/or software.

In one embodiment, program modules and routines may be stored in mass storage memory 414, loaded into system memory 412, and executed by a processor 402 or may be provided from computer program products that are stored in tangible computer-readable storage mediums (e.g. RAM, hard disk, optical/magnetic media, etc.).

The peripheral I/O controller 410 may perform functions that enable the processor 402 to communicate with a peripheral input/output (I/O) device 424, a network interface 426, a local network transceiver 428. (via the network interface 426) via a peripheral I/O bus. The I/O device 424 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 424 may be used with the module 416, etc., to receive data from the transceiver 428, send the data to the components of the system 100, and perform any operations related to the methods as described herein. The local network transceiver 428 may include support for a Wi-Fi network, Bluetooth, Infrared, cellular, or other wireless data transmission protocols. In other embodiments, one element may simultaneously support each of the various wireless protocols employed by the computing device 401. For example, a software-defined radio may be able to support multiple protocols via downloadable instructions. In operation, the computing device 401 may be able to periodically poll for visible wireless network transmitters (both cellular and local network) on a periodic basis. Such polling may be possible even while normal wireless traffic is being supported on the computing device 401. The network interface 426 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 408 and the I/O controller 410 are depicted in FIG. 4 as separate functional blocks within the chipset 406, the functions performed by these blocks may be integrated within a single integrated circuit or may be implemented using two or more separate integrated circuits. The computing environment 400 may also implement the module 416 on a remote computing device 430. The remote computing device 430 may communicate with the computing device 401 over an Ethernet link 432. In some embodiments, the module 416 may be retrieved by the computing device 401 from a cloud computing server 434 via the Internet 436. When using the cloud computing server 434, the retrieved module 416 may be programmatically linked with the computing device 401. The module 416 may be a collection of various software playgrounds including artificial intelligence software and document creation software or may also be a Java® applet executing within a Java® Virtual Machine (JVM) environment resident in the computing device 401 or the remote computing device 430. The module 416 may also be a "plug-in" adapted to execute in a web-browser located on the computing devices 401 and 430. In some embodiments, the module 416 may communicate with back end components 438 via the Internet 436.

The system 400 may include but is not limited to any combination of a LAN, a MAN, a WAN, a mobile, a wired or wireless network, a private network, or a virtual private network. Moreover, while only one remote computing device 430 is illustrated in FIG. 4 to simplify and clarify the description, it is understood that any number of client computers may be supported and may be in communication within the system 400.

Additionally, certain embodiments may be described herein as including logic or a number of components, modules, blocks, or mechanisms. Modules and method blocks may constitute either software modules (e.g., code or instructions embodied on a machine-readable medium or in a transmission signal, wherein the code is executed by a processor) or hardware modules. A hardware module may be a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" may be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" may refer to a hardware module. Considering embodiments in which hardware modules are temporarily configured (e.g., programmed), each of the hardware modules need not be configured or instantiated at any one instance in time. For example, where the hardware modules include a processor configured using software, the processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations may be examples of techniques used by those of ordinary skill in the data processing arts to convey the substance of their work to others skilled in the art. As used herein, an "algorithm" may be a self-consistent sequence of operations or similar processing leading to a desired result. In this context, algorithms and operations may involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content." "bits," "values," "elements," "symbols," "characters," "terms," "numbers," "numerals," or the like. These words, however, may be merely convenient labels and are to be associated with appropriate physical quantities.

Unless specifically stated otherwise, discussions herein using words such as "processing." "computing," "calculating." "determining," "presenting," "displaying." or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "embodiments," "some embodiments" or "an embodiment" or "teaching" may mean that a particular element, feature, structure, or characteristic described in connection with the embodiment is included in at least one embodiment. The appearances of the phrase "in some embodiments" or "teachings" in various places in the specification may not necessarily all be referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments may not be limited in this context.

Further, the figures depict preferred embodiments for purposes of illustration only. One skilled in the art may be readily recognize from the following discussion that alternative embodiments of the structures and methods illustrated herein may be employed without departing from the principles described herein Upon reading this disclosure, those of skill in the art may appreciate still additional alternative structural and functional designs for the systems and methods described herein through the disclosed principles herein. Thus, while particular embodiments and applications have been illustrated and described, it is to be understood that the disclosed embodiments may not be limited to the precise construction and components disclosed herein. Various modifications, changes and variations, which may be apparent to those skilled in the art, may be made in the arrangement, operation and details of the systems and methods disclosed herein without departing from the spirit and scope defined in any appended claims.

The invention claimed is:

1. A computer-implemented method of receiving information for a first notice of loss for a vehicle loss, the method comprising:

receiving, by one or more processors, an oral communication to report the vehicle loss;

storing electronic audio data of the oral communication in a memory;

converting the electronic audio data to transcribed text using a voice transcription system;

determining whether words or phrases in the transcribed text relate to known first notice of loss fields using a field detection model;

in response to determining that a word or phrase in the transcribed text relates to a known first notice of loss field, using a value detection module to extract and associate a value from the transcribed text with the known first notice of loss field in an electronic first notice of loss record;

after the words or phrases in the transcribed text have been analyzed, calculating, using a completeness index calculation module, a numerical completeness index for the electronic first notice of loss record;

wherein the completeness index calculation module analyzes at least one of a total number of first notice of loss fields filled, an accuracy of detected values, an importance of each field in the context of straight-through processing prediction, and a presence of required or conditional fields;

wherein calculating the numerical completeness index comprises applying a weighted scoring system that assigns greater importance to critical first notice of loss fields;

based on the numerical completeness index, determining whether interactive questions are needed to fill first notice of loss fields and obtain an acceptable completeness index score;

wherein, when the numerical completeness index is below a threshold, the method further comprises automatically asking questions based on a category of the vehicle loss to fill one or more first notice of loss fields;

receiving responses to the questions;

using the responses to update the one or more first notice of loss fields;

in response to text in a response not being understood, using machine language to interpret the text and repeat the interpreted text back; and based on the interpreted text and the updated one or more first notice of loss fields, recalculating the numerical completeness index.

2. The method of claim 1, wherein the method further comprises using a license plate number and a state extracted from the transcribed text to determine a vehicle identification number that was not included in the oral communication.

3. The method of claim 1, wherein the method further comprises identifying a relative time expression in the transcribed text and determining an approximate accident time based on the relative time expression and a time associated with the oral communication.

4. The method of claim 1, wherein the known first notice of loss fields comprise at least a date field, a calling number field, a time field, a responsibility field, a covered vehicle field, a license plate field, a vehicle identification number field, an injuries field, a damage field, an air-bag deployment field, a photos field, and an other-vehicle field.

5. The method of claim 1, wherein the field detection model comprises a field identification module that uses supervised machine learning, unsupervised machine learning, and predefined first notice of loss dictionaries to match the transcribed text to corresponding first notice of loss fields.

6. The method of claim 5, wherein the field identification module accounts for field-name variations, synonyms, and abbreviations when matching the transcribed text to the corresponding first notice of loss fields.

7. The method of claim 5, wherein the field identification module normalizes a vehicle model term in the transcribed text to a vehicle manufacturer even when the vehicle manufacturer is not expressly stated in the transcribed text.

8. The method of claim 7, wherein the field identification module learns from previously received and corrected first notice of loss messages to associate the vehicle model term with the vehicle manufacturer in later first notice of loss messages.

9. The method of claim 1, wherein, when the recalculated numerical completeness index satisfies the threshold, the method proceeds with straight-through processing by pre-populating an estimate and automatically generating estimate lines including operations, part selections, and pricing using artificial intelligence and vehicle and claims data.

10. The method of claim 9, wherein the straight-through processing further comprises analyzing photos or videos of vehicle damage and generating component-level estimate lines for appraiser review and approval.

11. The method of claim 1, wherein the electronic audio data comprises an electronic sound file, and wherein the electronic sound file is stored using encryption and accessed through an application programming interface.

* * * * *